Sept. 25, 1951  P. GRAY  2,568,917

METHOD OF SEALING OPENINGS IN SHELL EGGS

Filed Dec. 29, 1949

INVENTOR
PETER GRAY
By his attorneys
Hoopes, Leonard & Glenn

Patented Sept. 25, 1951

2,568,917

UNITED STATES PATENT OFFICE 2,568,917

METHOD OF SEALING OPENINGS IN SHELL EGGS

Peter Gray, Pittsburgh, Pa., assignor to Milrose Foods Company, Pittsburgh, Pa., a partnership Application December 29, 1949, Serial No. 135,792

6 Claims. (Cl. 99—113)

This invention relates to a system of sealing small openings in shell eggs and the like, particularly after the withdrawal of needles through which substances have been injected into the shell eggs.

Shell eggs, i. e., eggs still in their shells, have long been injected with various substances in laboratories and the like for experimental and other special purposes, and the opening in the shell made by the injection needle has been covered by means such as tape, wax, lacquer or liquid household cement; cf. Hofmann Patent No. 1,635,843 and Kiss 2,477,752. These sealing means have only limited suitability even for special purposes where the eggs can be carefully handled, and are unsatisfactory for any general use where the egg must pass through regular commercial channels and the appearance of the egg is a factor. Tape is bulky and conspicuous, and wax, lacquer and liquid household cement do not dissolve in the aqueous white of the egg and therefore merely form an outer crust over the opening. Such a crust is anchored only on the outer surface of the shell, which must be carefully dried before the wax, lacquer or liquid household cement is applied, and subsequent rubbing is likely to break or dislodge the crust and thereby destroy the seal. The careful operations necessary to apply such conventional sealing means are an additional factor making these means unsuitable for commercial purposes, where the sealing means must be low in cost as well as being inconspicuous, tough enough to survive any handling which the shell of the egg can survive, and tight enough to prevent escape or contamination of the contents of the egg during storage or cooking of the egg in its shell. No seal meeting these tests of commercial acceptability has heretofore been found.

I have discovered that the application of plaster (consisting principally of $(CaSO_4)_2 \cdot H_2O$) to a small opening in a shell egg results in the formation of a hard, tough plug which perfectly answers all of the tests of commercial acceptability, as well as being highly satisfactory for laboratory and other special purposes. The manner in which the plaster is applied depends upon the nature of the opening in the egg. In the comparatively rare case where the opening in the egg extends through the shell but does not open into the liquid portion of the egg, the plaster should be mixed with water and then applied to the opening. On the other hand, in the usual case where the opening extends through the shell and also through the membrane where it is in contact with the shell, the aqueous white of the egg supplies the necessary moisture and the plaster is applied in powdered, dry form to the opening, preferably by placing the portion of the egg adjacent the opening in a bed of powdered dry plaster and then removing the egg and wiping off the plaster adhering to the outer surface of the shell. The plaster left in the opening dissolves and then crystallizes into a dense, hard plug which has an outer end substantially coplanar with the outer shell surface as a result of the wiping off of excess plaster, and has sides tightly gripping the surrounding edges of the shell. This tight grip is one of the most important features of the plug and results from swelling of the plug during hardening. This is a characteristic of plaster which is not shared by other calcium-compound materials such as mortar and Portland cement, or by non-calcium-compound materials such as wax, lacquer and liquid household cement. Moreover, the dissolution of plaster in the aqueous white of the egg before the plug begins to harden plus the swelling of the plug during hardening causes the interior end of the plug to overlap the membrane in a rivetlike manner. The overlapping inner end of the plug tightly seals the membrane against leakage at the opening and also opposes pressure from within the egg tending to blow the plug out of the opening, such as pressure developed during boiling of the egg in its shell. The sealing of the opening in the membrane as well as in the shell is highly important because the membrane is far less porous than the shell and serves to prevent escape and contamination of the contents of the egg. If the opening in the membrane is not sealed part of the liquid white of the egg can escape between the membrane and the shell and thereby become exposed to contaminating agents which pass through the relatively porous shell. Such exposure risks infection in spite of the somewhat antibiotic nature of an egg white.

The portion of the plug exposed to view is flush with the outer surface of the shell and is as small as the opening which it seals. The plug is thus quite inconspicuous and becomes virtually imperceptible even under the closest inspection when the plaster is pigmented to match the shell before being applied to seal the opening.

I have also discovered that other water-soluble cementitious materials, such as mortar and Portland cement, may be used as a dry powder in place of plaster for the sealing of an opening in a shell egg, but the resultant seal is not as satisfactory and reliable because these other materials do not expand appreciably as they harden and do not wholly dissolve and deeply penetrate into the opening before hardening.

I have shown in the drawings, for purposes of illustration only, a present preferred practice and embodiment of my invention, in which.

Figure 1:
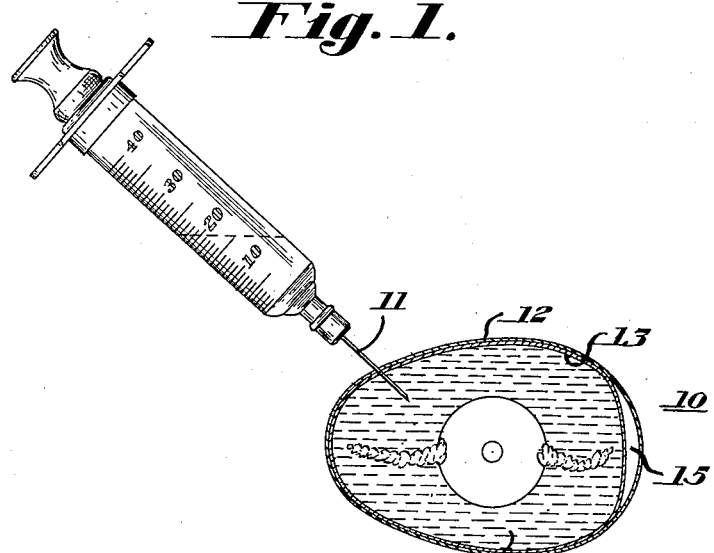
Figure 1 is a cross-sectional view of a shell egg receiving an injection from a hypodermic syringe, shown with exaggerated wall thicknesses.
Figure 2:
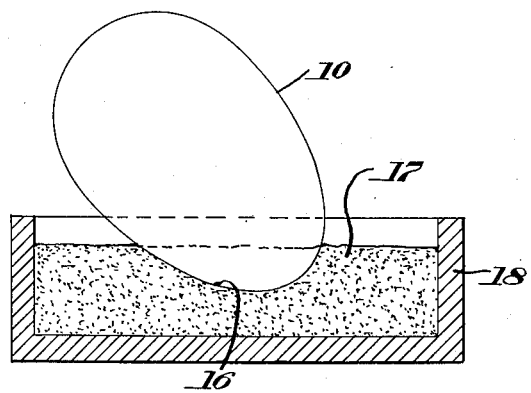
Figure 2 is a partially sectioned view of the punctured egg being pressed into a bed of plaster of Paris.
Figure 3:
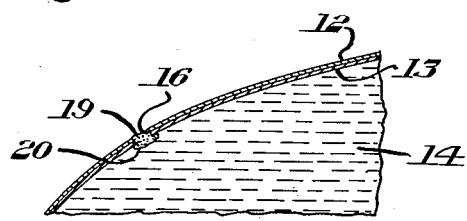
Figure 3 is an enlarged sectional view of the punctured portion of the egg sealed with a plaster plug.

Referring now more particularly to the drawings, a shell egg 10 is shown in Figure 1 being injected through a hypodermic needle 11 thrust through the shell 12 and membrane 13 into the albuminous portion 14 of the egg near its pointed end, away from the air space 15 between the membrane 13 and shell 12. The substance injected through the needle 11 is preferably sterilized and the area of the outer surface of the shell 12 is preferably cleaned with alcohol to prevent contamination during the injection operation. The membrane 13 expands and forces some of the air in the space 15 through the relatively porous shell 12 to accommodate the substance injected through the needle 11, and after the injection has been completed the needle 11 is withdrawn, leaving a small opening 16 through the shell 12 and membrane 13 (Figure 3). The practice thus far described is conventional.

The opening 16 is sealed by placing the portion of the shell 12 containing the opening 16 in dry, powdered plaster of Paris 17 in a suitable container 18, leaving it there for a few moments to allow absorption of plaster by moisture on the outer surface of the shell, removing and wiping off the shell across the opening 16 with a clean, moist cloth, replacing the same portion of the shell in the plaster 17 for a few more moments to allow absorption of plaster by the moisture of the the albuminous portion of the egg adjacent and within the opening 16, and wiping off the outer surface of the shell 12 with a clean, moist cloth to remove all plaster adhering to the outer surface of the shell 12 and to cause the outer end of the plaster in the opening 16 to extend flush with the outer surface of the shell 12. In a short time all of the plaster in the opening 16 dissolves and subsequently hardens into a dense, hard plug 19 (Figure 3), which is wedged closely and tightly in the opening 16 by expansion of the plaster 17 during hardening, and at its inner end 20 overlaps the edges of the membrane 13 around the opening 16. The overlapping inner end 20 of the plug thus opposes outward movement of the plug through the opening 16 and also clamps the perforated edges of the membrane 13 against the shell 12 around the opening 16 and thereby reseals the membrane 13 as well as the shell 12. After the plug 19 has hardened the egg 10 may be washed or boiled without disturbing the plug.

The plaster 17 is preferably sterilized by heating to 160° C. before being used for sealing shell eggs, and when this precaution as well as the other procedures outlined above are followed the egg is not contaminated during injection and sealing, and the plug 19 effectively blocks contamination thereafter. The plaster known as plaster of Paris is preferred but plasters known by other names having as their principal constituent $$(CaSO_4)_2 \cdot H_2O$$

may be substituted for the purposes of the invention without significant change in results.

For some purposes it is desirable to make the plug 19 inconspicuous on a shell egg, such as when it is desired to make a plugged shell egg fully acceptable by a consumer. In such cases the plaster 17 is prefereably mixed with pigments to match the egg shell before being heat-sterilized. For white shell eggs about 10% titanium dioxide is added, for brown eggs about 10% titanium dioxide, 2% yellow ochre and 3% burnt umber are added, and for the somewhat blue eggs of ducks about 10% titanium dioxide, 1% yellow ochre and 1% cobalt blue are added. When the plaster is thus pigmented to match the shell the sealed opening is virtually imperceptible.

While I have illustrated and described certain present preferred embodiments and methods of practicing the invention it will be recognized that the invention is not limited thereto but may be otherwise variously embodied and practiced within the scope of the following claims.

I claim:

1. A method of sealing a small opening through the shell and the membrane in contact therewith of a shell egg, comprising applying a water-soluble cementitious compound in dry, powdered form to the opening, whereby a plug is formed in the opening by the hardening action of moisture within the egg on the compound in the opening.

2. A method of sealing a small opening through the shell and the membrane in contact therewith of a shell egg, comprising applying a water-soluble cementitious calcium compound in dry, powdered form to the opening, whereby a plug is formed in the opening by the hardening action of moisture within the egg on the compound in the opening.

3. A method of sealing a small opening through the shell and the membrane in contact therewith of a shell egg, comprising applying plaster in dry, powdered form to the opening, whereby a plug is formed in the opening by the hardening action of moisture within the egg on the plaster in the opening.

4. A method of sealing a small opening through the shell and the membrane in contact therewith of a shell egg, comprising heat-sterilizing dry, powdered plaster of Paris and applying it to the opening, whereby a plug is formed in the opening by the hardening action of moisture within the egg on the plaster in the opening.

5. A method of inconspicuously sealing a small opening through the shell and the membrane in contact therewith of a shell egg, comprising applying dry, powdered plaster to the opening, and, after at least time sufficient for wetting of plaster in the opening by moisture within the egg, wiping the outer surface of the shell of the egg across the opening.

6. A method of sealing a small opening through the shell and the membrane in contact therewith of a shell egg, comprising mixing dry, powdered plaster with coloring material to match the color of the shell, applying the mixture to the opening, and, after at least time sufficient for wetting of plaster in the opening by moisture within the egg, wiping the outer surface of the shell across the opening.

PETER GRAY.

REFERENCES CITED

The following references are of record in the file of this patent:

FOREIGN PATENTS

| Number | Country | Date |
|--------|---------|------|
| 519 | Great Britain | Mar. 8, 1855 |
| 1,708 | Great Britain | May 2, 1877 |